US007228383B2

(12) United States Patent
Friedman et al.

(10) Patent No.: US 7,228,383 B2
(45) Date of Patent: Jun. 5, 2007

(54) SYSTEM AND METHOD FOR PROGRESSIVE AND HIERARCHICAL CACHING

(75) Inventors: Gregory Scott Friedman, Sammamish, WA (US); Coyle Brett Marl, Seattle, WA (US)

(73) Assignee: Visto Corporation, Redwood City, CA (US)

( * ) Notice: Subject to any disclaimer, the term of this patent is extended or adjusted under 35 U.S.C. 154(b) by 0 days.

(21) Appl. No.: 09/872,753

(22) Filed: Jun. 1, 2001

(65) Prior Publication Data

US 2002/0199061 A1   Dec. 26, 2002

(51) Int. Cl.
*G06F 13/00* (2006.01)
(52) U.S. Cl. .................. 711/118; 709/217; 709/220; 709/248
(58) Field of Classification Search ............... 709/206; 711/118
See application file for complete search history.

(56) References Cited

U.S. PATENT DOCUMENTS 5,835,087 A  11/1998 Herz et al.

6,052,735 A  4/2000 Ulrich et al.
6,389,455 B1  5/2002 Fuisz et al.

FOREIGN PATENT DOCUMENTS

JP  020000014  1/2000

OTHER PUBLICATIONS

M.C. Chan et al. "Application of Compaction Technique to Optimizing Wireless Email Transfer," IEEE Wireless Communications and Networking Conference 1999, p. 1535 Section A.
M. Crispin "Internet Message Access Protocol—Version 4 rev1," 1996 Section 2.3.1.1.

*Primary Examiner*—Jasmine Song
(74) *Attorney, Agent, or Firm*—Oblon, Spivak, McClelland, Maier & Neustadt, P.C.

(57) ABSTRACT

A system and method that allows a user to update the contents of a portable electronic mail account to correspond with the contents of a user's regular electronic mail account, where only discrete portions of the regular electronic mail account are progressively cached in the portable electronic mail account according to a hierarchy with each update operation. By updating only a portion of the regular electronic mail account with each update operation, the service provider can minimize the amount of memory storage and communication expense necessary to maintain the portable electronic mail account, while still permitting the user to access the information important to the user.

15 Claims, 4 Drawing Sheets

SYSTEM AND METHOD FOR PROGRESSIVE AND HIERARCHICAL CACHING

FIELD OF THE INVENTION

The invention relates to a system and method for progressively building a cached representation, in one location, of a data set that is stored persistently in another location. More particularly, the invention relates to a method and system of periodically updating the contents of a cached representation of a data set according to a hierarchical order, so as to minimize the size of the cache, the frequency at which the cache is updated, or both.

BACKGROUND OF THE INVENTION

Electronic mail has become a commonly used and widely accepted means of communication. As a result, it is not unusual for some individuals to send and receive more than a hundred electronic mail messages in a single day. This has led to an explosion in the size of the memory required for many electronic mail accounts. For example, there are some corporate users whose mailboxes routinely exceed 50 Mbytes in size and for whom a single message with one or more attachments will often contain 5 Mbytes or more of data. Consumers also use electronic mail (or other techniques for routing electronic data files) to exchange music and other multi-media files, and these files will frequently contain multiple Megabytes of data.

As the use of electronic mail continues to grow, so does the need to access electronic mail accounts from a variety of locations. For example, many now use portable electronic communication devices for sending and retrieving electronic mail messages. These portable communication devices, which include wireless telephones, personal digital assistants, specialized portable electronic mail messaging devices, and even laptop computers, allow users to conveniently access their electronic mail accounts from almost any location, without being tied down to a stationary personal computer or network workstation.

In order to use these portable communication devices to retrieve electronic mail from one or more existing electronic mail accounts, however, the user must typically set up a new electronic mail account, specific to the device, with a service provider. The service provider must then retrieve the electronic mail files that make up the contents of the user's existing electronic mail account (i.e., the user's "regular" electronic mail account) or accounts, and store these contents in the user's electronic mail account or accounts for the portable electronic device (i.e., the user's "portable" electronic mail account or accounts). The user can then access this synchronized portable electronic mail account from the portable communication device.

Similarly, many now use aggregate electronic mail accounts to simultaneously access a variety of other existing electronic mail accounts. Again, the service provider for the aggregate electronic mail account must retrieve the contents of the user's existing regular electronic mail accounts, and synchronize these contents in the user's aggregate electronic mail account.

With a multi-tiered Web services architecture (e.g., an architecture made up of storage, networking, front-end servers and application servers), however, this synchronization process typically requires the underlying system to scale at the storage tier, which is usually the most expensive in terms of resources. Thus, in order to make this synchronization service cost effective, the service provider will generally: (a) place a strict limit on the amount of storage memory available to the user to maintain his or her portable electronic mail account (e.g., between 2–5 Megabytes is common), or (b) charge the user a premium for the right to use more than a threshold amount of storage memory (e.g., $10–$20/month for each extra 100 Megabytes of storage memory).

When the amount of available storage is strictly capped, a user may be denied access to a particular mailbox or to a particular message within a mailbox because the storage memory cap was exceeded before all of the mailboxes or messages could be copied into the portable electronic mail account. On the other hand, where users are charged a premium for additional memory storage, the users are typically unwilling to pay an amount sufficient to cover the direct costs of such storage and/or provide a profit margin for the service provider. Accordingly, neither of these approaches is satisfactory for maintaining a portable electronic mail account.

BRIEF SUMMARY OF THE INVENTION

There is therefore a need for an electronic mail service that allows a user to employ a portable electronic mail account to more efficiently retrieve and examine the contents of one or more of his or her regular electronic mail accounts. The present invention advantageously provides a system and method that allows a user to update the contents of a portable electronic mail account to correspond with the contents of a user's regular electronic mail account, where only discrete portions of the regular electronic mail account are progressively cached in the portable electronic mail account according to a hierarchy with each update operation. By updating only a portion of the regular electronic mail account with each update operation, the service provider can minimize the amount of memory storage and communication expense necessary to maintain the portable electronic mail account, while still permitting the user to access the information important to the user.

Moreover, according to the method and system of the invention, each progressive updating step is performed in response to specific triggers. According to the invention, a trigger can be a specific request for an update operation from the user. A trigger may also be a predictive indicator, generated upon a prediction that the user desires to initiate an update operation. For example, the user may routinely initiate an update procedure to retrieve and cache the entire contents of each electronic mail message from the user's work supervisor. The method and system of the invention can then employ this routine habit of the user to predict that the user will want to initiate an update procedure to retrieve and cache the entire contents of all future electronic mail messages from the supervisor. Thus, when the electronic mail service detects an electronic mail message from the supervisor in the user's regular mailbox, the invention will generate a predictive indicator to initiate an update operation to retrieve and cache the contents of the message.

DETAILED DESCRIPTION OF THE INVENTION

Figure 1:
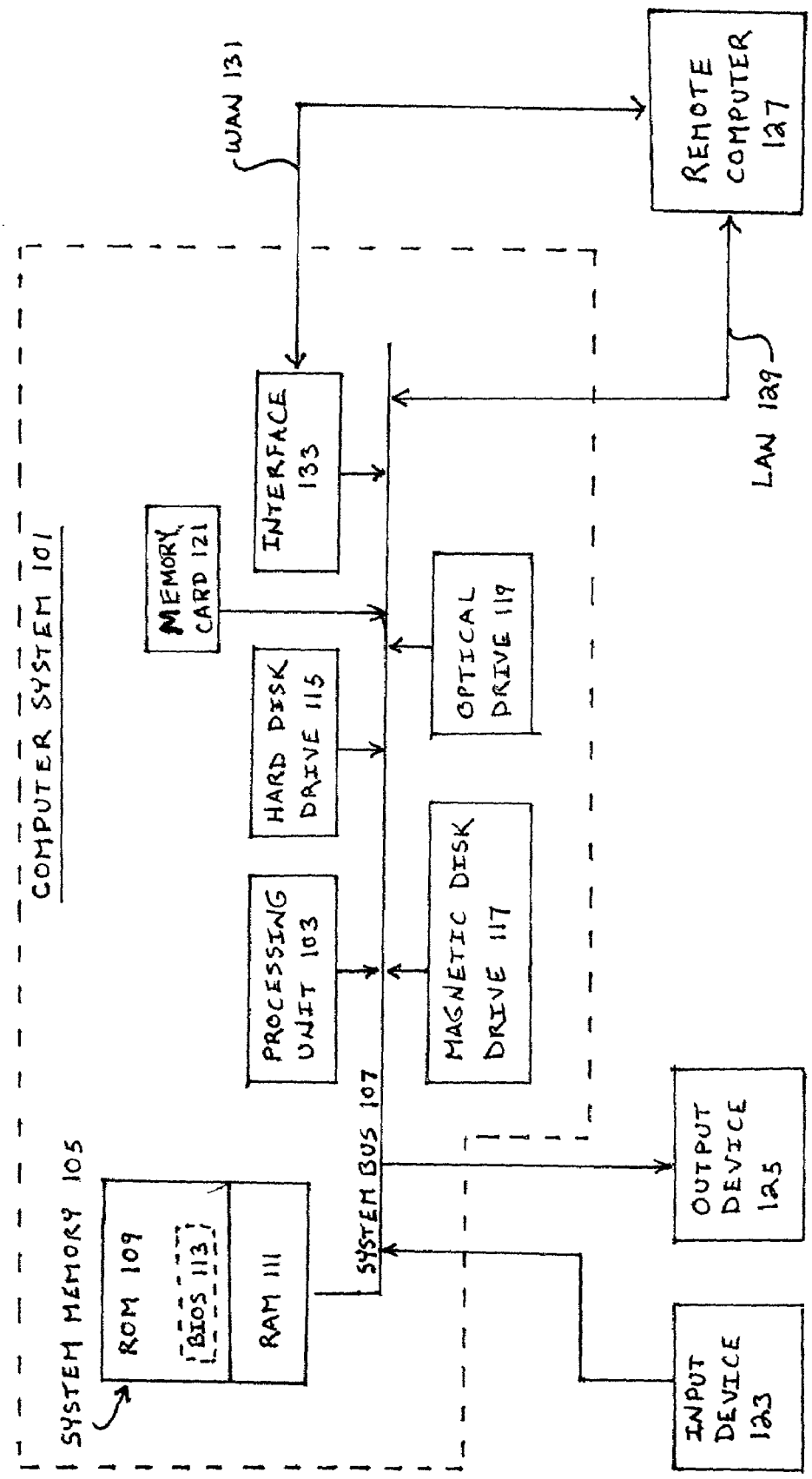
FIG. 1 illustrates one possible computing device for implementing various embodiments of the invention.

As is well known in the art, electronic mail accounts are conventionally maintained by programmable computers that are programmed to send, retrieve and store the data files that make up electronic messages. This type of computer can be embodied by, for example, an electronic mail account server. FIG. 1 shows one example of such a programmable computer system 101 capable of retrieving and caching electronic mail data files from an outside electronic mail account. The computer system 101 includes a processing unit 103, a system memory 105, and a system bus 107 that couples various system components, including the system memory 105, to the processing unit 103. The system memory 105 may include a read-only memory (ROM) 109 and a random access memory (RAM) 111.

A basic input/output system 113 (BIOS), containing the routines that help to transfer information between elements within the computer system 101, such as during startup, may be stored in the read-only memory (ROM) 109. If the computer system 101 is embodied by a personal computer, it may further include a hard disk drive 115 for reading from and writing to a hard disk (not shown), a magnetic disk drive 117 for reading from or writing to a removable magnetic disk (not shown), or an optical disk drive 119 for reading from or writing to a removable optical disk (not shown) such as a CD-ROM or other optical media.

A number of program modules may be stored on the ROM 109, the hard disk drive 115, the magnetic disk drive 117, and the optical disk drive 119. A user may enter commands and information into the computer system 101 through an input device 123, such as a keyboard, a pointing device, a touch screen, a microphone, a joystick or any other suitable interface device. Of course, the computer system 101 may employ a variety of different input devices 123, as is known in the art. An output device 125, such as a monitor or other type of display device, is also included to convey information from the computer system 101 to the user. As will be appreciated by those of ordinary skill in the art, a variety of output devices 125, such as speakers and printers, may alternately or additionally be included in the computer system 101.

In order to access electronic mail accounts, the computer system 101 preferably is capable of operating in a networked environment using logical connections to one or more remote computers, such as the remote computer 127. The computer system 101 may be connectable to the remote computer 127 through a local area network (LAN) 129 or a wide area network (WAN) 131, such as the Internet. When used in a networking environment, the computer system 101 may be connected to the network through an interface 133, such as a wireless transceiver, a modem, an Ethernet connection, or any other such interface. While the interface 133 is illustrated as an internal interface in FIG. 1, it may alternately be an external interface as is well known in the art. Of course, it will be appreciated that the network connections shown in this figure are exemplary, and other means of establishing a communications link with other computers to access an electronic mail account may be used.

Figure 2:
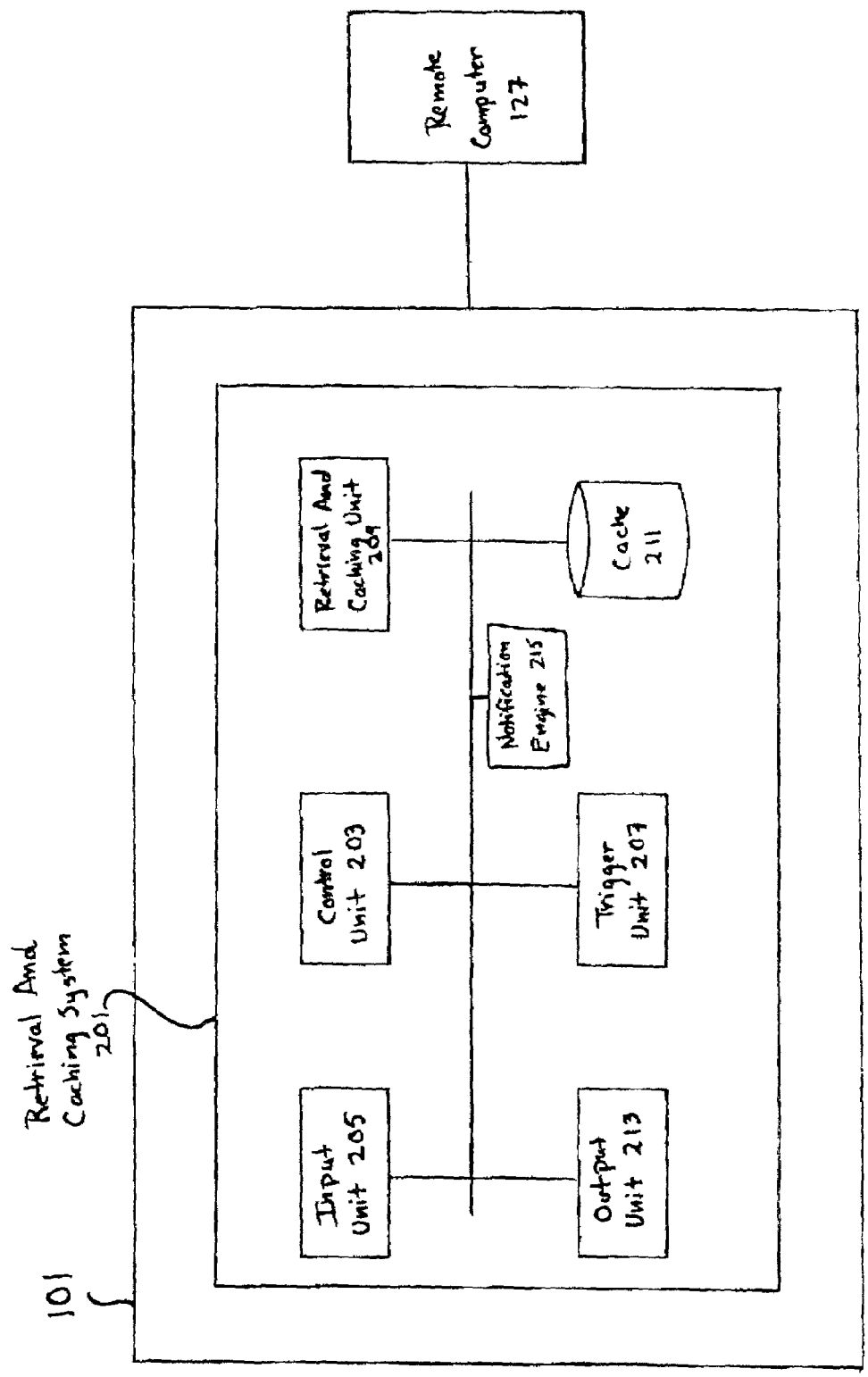
FIG. 2 shows a schematic embodiment of a caching device according to an embodiment of the invention.

An electronic mail retrieval and caching system according to one embodiment of the invention is shown in FIG. 2. As will be discussed in detail below, the retrieval and caching system 201 progressively retrieves and caches various portions of electronic mail message data files from an electronic mail account maintained by a remote computer 127 according to a hierarchical order. The caching system 201 includes a control unit 203, for controlling the exchange of information between the various components of the system 201, and an input unit 205. The input unit 205 receives information both directly from a user of an electronic mail account maintained at the remote computer 127, and from other software applications working with the retrieval and caching system 201. The caching system 201 further includes a trigger unit 207, which generates triggers in response to recognizing a triggering event in information provided through the input unit 205, as will be discussed below.

The retrieval and caching system 201 also has a retrieval and caching unit 209 and a cache 211. In response to receiving a trigger from the trigger unit 207, the retrieval and caching unit 209 retrieves information from one or more electronic mail accounts maintained at the remote computer 127. It then stores the retrieved information in the cache 211. The retrieval and caching system 201 may also include an output unit 213, for outputting cached information to the user or to another software application working with the caching system 201. Still further, the retrieval and caching system 201 may include a notification engine 215. As will be discussed in detail below, the notification engine 215 periodically initiates an update operation to retrieve data into the cache 211 from the remote computer 127.

As will be appreciated by those of ordinary skill in the art, one or more components of the retrieval and caching system 201 can be embodied using software implemented on a computer system, such as the computer system 101 shown in FIG. 2. For example, the input unit 205, the output unit 213, the trigger unit 207, the retrieval and caching unit 209 and the notification engine 215 can be embodied by software subroutines. The control unit 203 may then be a control software routine that calls the various software subroutines embodying the different units 205–209, 213 and 215. Of course, those of ordinary skill in the art will appreciate that one or more of the units 203–211 can also be embodied by electronic circuitry. The cache 211 may then be implemented on any suitable type of memory storage, such as the RAM 111, the hard disk drive 115, the magnetic disk drive 117, or an optical disk drive 119.

According to some preferred embodiments of the invention, the retrieval and caching system 201 operates as a read-through cache. Thus, when a user requests data from the retrieval and caching system 201, the retrieval and caching system 201 first checks its own cache 211 for the requested data. If the cache 211 does not yet contain the requested data, then the request is "read-through" to the remote computer 127. That is, if the cache 211 does not contain the requested data, the retrieval and caching system 201 retrieves the requested data from the remote computer 127, and provides it to the user. The retrieval and caching system 201 also updates the contents of the cache 211 with the data retrieved from the remote computer 127 for future access by the user.

According to some embodiments of the invention, the retrieval and caching system 201 progressively updates the contents of the cache 211 with discrete categories of data from electronic mail message data files in an electronic mail account maintained on the remote computer 127 (e.g., the user's regular electronic mail account). Moreover, with some embodiments of the invention, the retrieval and caching system 201 progressively updates the contents of the cache 211 according to a hierarchical order.

For example, the retrieval and caching system 201 according to some preferred embodiments of the invention may categorize the information contained within an electronic mail message into a hierarchy with four discrete levels or tiers. The highest level of information may be an identifier for uniquely identifying each message in the remote electronic mail account. In this embodiment, the retrieval and caching system 201 will update only unique identifiers in the cache 211 with each message in the remote electronic mail account during the highest-level of the update procedure. For example, if the user's regular electronic mail account employs the commonly-used version three of the post office protocol (conventionally referred to by the acronym POP3), then the caching system 201 may update only Unique Indentification Listing (UIDL) identifier used by the POP3 protocol during an update procedure.

Thus, if the electronic mail account contains a message that is not identified in the cache 211, the retrieval and caching system 201 will add an identifier corresponding to that message to the cache 211 during the highest-level of the update procedure. Similarly, if the retrieval and caching system 201 determines during the highest level update procedure that the cache 211 contains an existing identifier for a message that has been purged from the electronic mail account, the retrieval and caching system 201 will purge that identifier (along with the electronic mail message contents corresponding to that identifier) from the cache 211. With an identifier for each message in the electronic mail account, the retrieval and caching system 201 can subsequently fetch and store other hierarchical levels of data associated with each specific electronic mail message in the remote electronic mail account, using the identifier as the key.

According to some preferred embodiments of the invention, the highest-level update procedure (i.e., the process of updating identifiers in the cache 211 to correspond with some or all of the messages in the electronic mail account) is performed for each update operation. For example, where the user's regular electronic mail account employs the POP3 protocol, each update procedure updates the identifiers in the cache 211 to ensure that the cached identifiers are current. With other preferred embodiments of the invention, however, an update procedure may perform the highest-level update of identifiers only when specifically prompted by a trigger to do so. For example, with some embodiments of the invention a user may request that the retrieval and caching system 201 retrieve only a lower hierarchical level of content (e.g., metadata, message text or attachments, as will be explained in detail below) from an electronic mail message whose identifier is already stored in the cache 211, without updating the identifiers in the cache 211.

The next highest level or tier of information for an electronic mail message may be the metadata for the message. The metadata may include, for example, the title, subject, author and size of the electronic mail message. With this categorization, for the next or second-highest level of the update procedure, the retrieval and caching system 201 may retrieve and cache only the metadata for all of the messages in the remote electronic mail account during an update operation. Alternately, the retrieval and caching system 201 may retrieve and cache the metadata for only one or more specific electronic mail messages in the second-highest level of updating during an update operation.

The information for an electronic mail message data file can be further categorized into a third tier corresponding to the entire text of the message. Thus, in the third-highest level of the update procedure, the retrieval and caching system 201 may retrieve and cache the contents of the electronic mail messages in the user's regular electronic mail account during an update operation. Alternately, in the third-highest level of the update procedure, the retrieval and caching system 201 may retrieve and cache the contents of only specifically designated electronic mail message during an update operation.

Still a fourth category of information for an electronic mail message data file may include attachments to the message, such as word processing or spreadsheet files that are appended to the message. Thus, with this fourth-highest level of updating, the retrieval and caching system 201 may retrieve and cache the attachments appended to each of the electronic mail message data files in a user's regular electronic mail account during an update operation. Alternately, for this fourth-highest level of updating, the retrieval and caching system 201 may retrieve and cache the attachments of only specific electronic mail messages in a user's regular electronic mail account during an update operation.

As will be appreciated by those of ordinary skill in the art, the hierarchical categorization of data and corresponding update levels are merely exemplary. In fact, information contained in an electronic mail account (or any other type of electronic data file repository, such as a file location directory) can be categorized into any number of different groups as convenient. By retrieving and caching only portions of each electronic mail message according to any convenient category, the retrieval and caching system 201 need only retrieve and cache as much of each message as desired by the user. This allows the system 201 to minimize the amount of memory required to update a user's portable electronic mail account with a user's regular electronic mail account, as information that is not important to the user will not be cached.

According to still other embodiments of the invention, the retrieval and caching system 201 also progressively updates the cache 211 with an electronic mail account. That is, these embodiments of the invention minimize the number of update operations needed to update a user's portable or aggregate electronic mail account with the user's regular electronic mail account by performing an update operation only when a trigger to initiate an update operation is generated.

A method of progressively updating the cache 211 with an electronic mail account on the remote computer 127 will now be explained in detail with reference to FIG. 3. In step 301, the update operation begins when the trigger unit 207 generates a trigger to initiate the update operation. More particularly, the trigger unit 207 receives input data from the input unit 205 that represents a triggering event, by, e.g., the user that causes the trigger unit to generate a trigger. According to various embodiments of the invention, a trigger can be a requested trigger, or it can be a predictive trigger. In addition, as will be explained below, a trigger can specify or be associated with a particular level of updating for the update operation.

A variety of input data may constitute a triggering event. One such triggering event occurs when a user's portable electronic mail account requests access to the user's regular POP3 electronic mail account. In response to this request, the trigger unit 207 generates a trigger to initiate an update operation that updates the cache with the highest level of information (i.e., the identifiers for each electronic mail message data file in the user's regular electronic mail account). The retrieval and caching system 201 then updates the identifiers in the cache 211 to correspond with the messages in the user's regular electronic mail account. This trigger may also specify that another level of updating for one or more of the messages in the user's electronic mail account be included in the update operation. For example, the user's regular electronic mail account may be configured to provide the user's portable electronic mail account with the ten most recent messages for display. With this arrangement, the trigger will also specify that the update operation update the second-highest level of hierarchical information (e.g., update the metadata) for the ten most recent messages in the user's regular electronic mail account.

Yet another triggering event may occur if the user wants to view the next ten most recent messages in his or her regular electronic mail account. For example, the user may scroll down the display interface for the his or her portable electronic mail account, prompting the portable electronic mail account to request the metadata for the next ten most recent messages in the user's regular electronic mail account. If the cache 211 does not already contain these contents, then the trigger unit 207 generates a trigger specifying an update operation that updates the second-highest level of hierarchical information for the next ten most recent messages in the user's regular electronic mail account. Based upon this trigger, the retrieval and caching system 201 will update the metadata for these messages in the cache 211 with the metadata for these messages in the user's regular electronic mail account.

Still another triggering event may occur if the user requests to view the contents of a particular message displayed in the user's portable electronic mail account. If the cache 211 does not already contain these contents, then the trigger unit 207 generates a trigger specifying an update operation that updates the third-highest level of hierarchical information for the specific electronic mail message identified in the request. In response to this trigger, the retrieval and caching system 201 will then update the content for this message in the cache 211 with the content of this message in the user's regular electronic mail account.

Still yet another triggering even may occur if the user requests to view an attachment to a particular message displayed in the user's portable electronic mail account. If the cache 211 does not already contain the attachment, then the trigger unit 207 generates a trigger specifying an update operation that includes updates the fourth-highest level of hierarchical information for the specific electronic mail message identified in the request. In response to this trigger, the retrieval and caching system 201 will then update the attachment for this message in the cache 211 with the attachment of this message in the user's regular electronic mail account.

It should be noted the trigger unit 207 can be configured to generate a trigger in response to data from sources other than the user. For example, as previously noted, various embodiments of the invention may include a notification engine 215 that periodically initiates an update operation. With these embodiments, the notification engine periodically initiates the update procedure to perform a background update of the cache (i.e., to perform an update procedure without the user's intervention). For example, the notification engine 215 can advantageously be used to have the retrieval and caching system 201 periodically update the cache 211 to include identifiers and metadata for new messages in the user's electronic mail account. This allows the user to avoid the delay of performing an update operation when the user's portable electronic mail account first accesses the user's regular electronic mail account.

Still further, with various embodiments of invention, the notification engine 215 can recognize information retrieved during these periodic update procedures to trigger an update of lower-level hierarchical information from the user's regular electronic mail account. For example, a user may configure the notification engine 215 to recognize when a periodic update of the cache 211 has retrieved the identifier and metadata for an electronic mail message from a particular individual (e.g., the user's spouse), and then retrieve lower-level hierarchical information from that message. This recognition capability, sometimes referred to as filtering, is well known to those of ordinary skill in the art. When the notification engine 215 recognizes that an update of the cache 211 has retrieved identifier and metadata for a message corresponding to preset parameters (e.g., a message from a specific author, a message received during a particular time of day, a message marked with a high priority, etc.), the notification engine 215 then prompts the trigger unit 207 to retrieve a designated level of hierarchical information for that message.

Of course, those of ordinary skill in the art will appreciate that the notification engine 215 can be configured to retrieve different levels of hierarchical information for different types of messages. For example, the notification engine 215 can be set up to retrieve only message text for a message from the user's spouse, but to retrieve all levels of hierarchical information (including attachments) from messages marked as a high priority (e.g., messages marked "urgent"). Still further, various embodiments of the invention can include a notification engine 215 that provides a real time message to the user that he or she has received an electronic mail message that should be reviewed.

In addition to specific requests for an update operation from the user, the trigger unit 207 may also generate a trigger in response to predictive triggering information (i.e., the trigger unit 207 to generate a predictive trigger). For example, the user may routinely submit requests to the system 201 to retrieve and cache the entire text of all electronic mail messages authored by a particular person (e.g., the user's work supervisor). From this pattern, the trigger unit 207 may create a predictive indicator that the user will want to retrieve the entire text of all future electronic mail messages authored by that person. Accordingly, if the operation of the notification engine 215 retrieves metadata indicating that the user's regular electronic mail account has received a new message from that particular person, the trigger unit 207 may be configured to generate a predictive trigger specifying an update operation that retrieves the contents of the new message into the cache 211.

In another example, if a user requests to view the contents of several (e.g., five) consecutive unopened messages in the user's regular electronic mail account, the trigger unit 207 may recognize that the user is simply reviewing the contents of all of that account's unopened messages in order. The trigger unit 207 may be configured to then generate a trigger that causes the system 201 to synchronize the cache 211 with the contents of the next five unopened messages on the user's regular electronic mail account.

Figure 3:
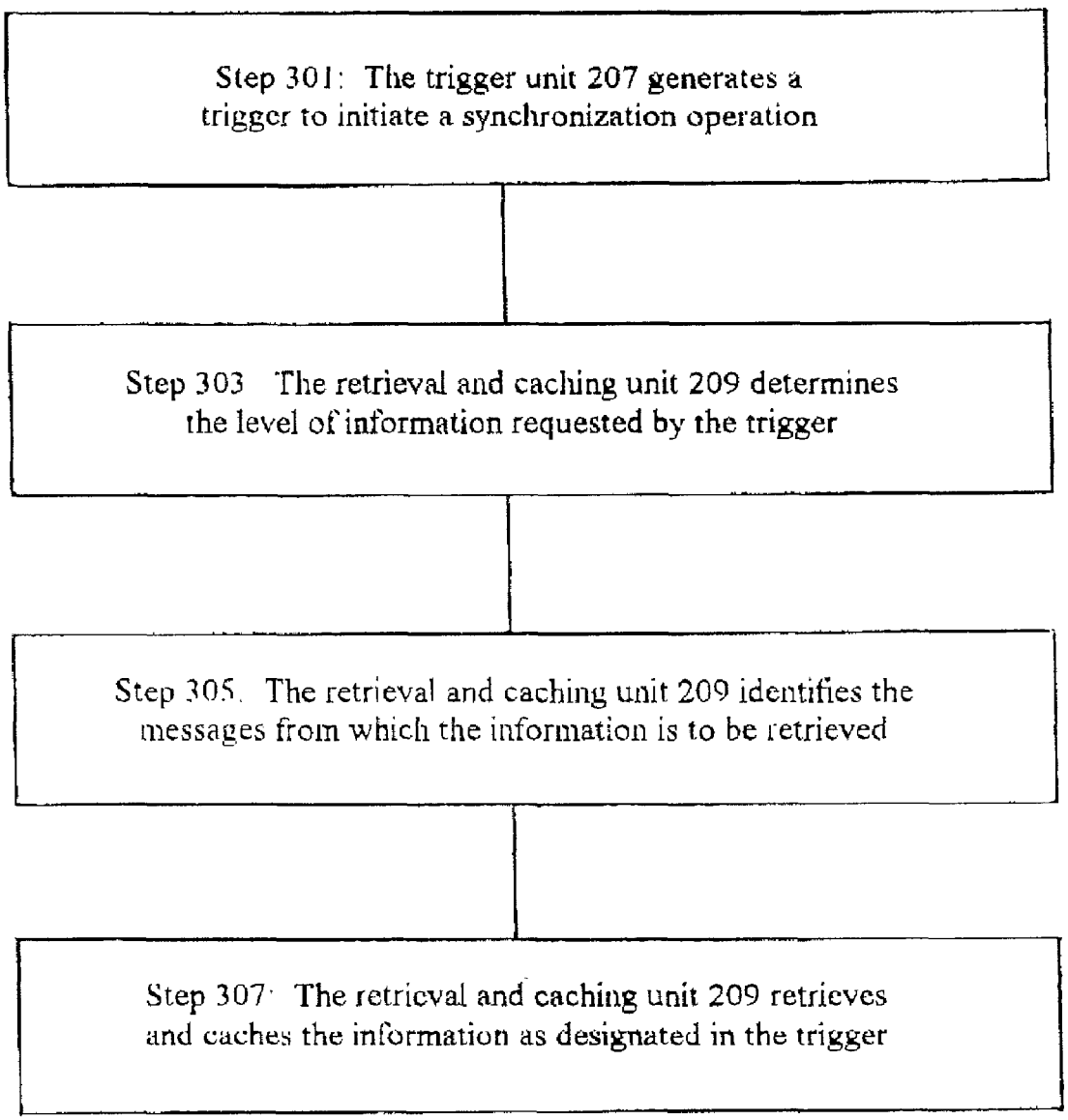
FIG. 3 illustrates a method of updating a cache for an electronic mail accounts according to an embodiment of the invention.

As shown in FIG. 3, after the trigger unit 207 issues a trigger, the retrieval and caching unit 201 initiates an update operation as specified by the trigger. First, in step 303, the retrieval and caching unit 209 identifies the level of information requested by the trigger. As previously noted, the trigger can request a specific level of information, or simply request that the next highest level of information be retrieved and cached. In step 305, the retrieval and caching unit 209 identifies the messages from which the information is to be retrieved. For example, the trigger may specify that information should be retrieved and cached from all of the electronic mail messages in a mailbox, just those messages sharing one or more properties (e.g., all messages received on a specific date), or a particular electronic mail message. Of course, those of ordinary skill in the art will appreciate that the order of steps 303 and 305 may be reversed.

Then, in step 307, the retrieval and caching unit 209 retrieves the information designated in the trigger from the specified electronic mail messages that were also designated in the trigger, and caches the retrieved information in the cache 211. From the cache 211, the user can access and view the information using the output unit 213.

Figure 4:
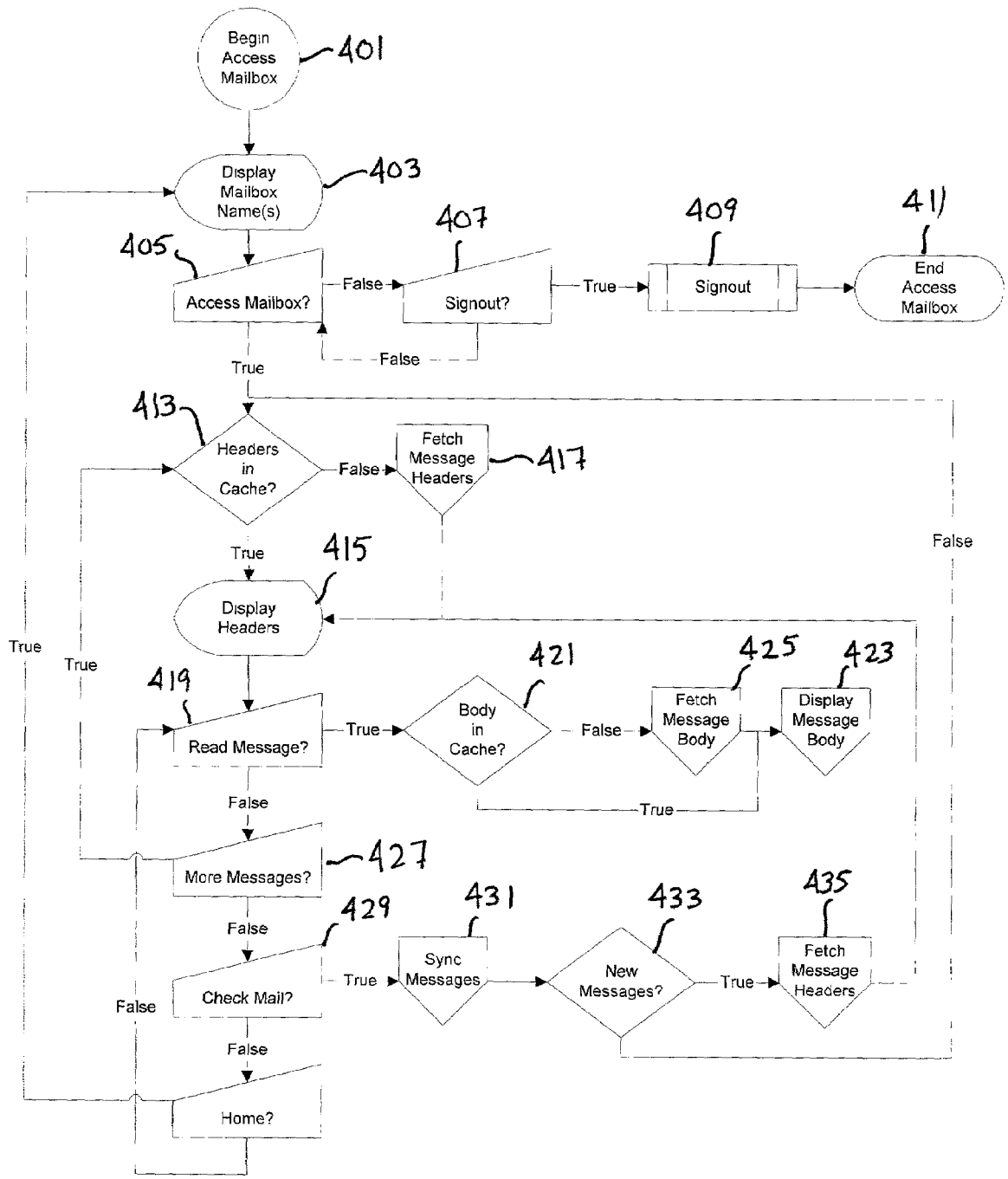
FIG. 4 illustrates a method of operation for one embodiment of the invention.

A more detailed description of one specific embodiment of the invention will now be made with reference to FIG. 4. As shown in this figure, in step 401 the user begins the process of accessing information contained in his or her regular electronic mail account using the retrieval and caching system 201 according to one embodiment of the invention. First, in step 403, the system 201 displays the name of the user's regular electronic mail account. Next, in step 405, the user may input a request to access information in that regular electronic mail account. If the user does not input a request to access the regular electronic mail account in step 405, then the user may alternately input an instruction to sign out of the access process in step 407. Upon receiving this instruction, a conventional sign out process is performed in step 409, and the process of accessing the regular electronic mail account ends in step 411.

If, however, the user submits a command to access his or her regular electronic mail account in step 405, the retrieval and caching system 201 determines in step 413 if the cache 211 contains one or more message headers corresponding to message identifiers previously stored in the cache 211. That is, the caching system 201 reviews at least some of the message identifiers (e.g., the highest level of hierarchical information) already stored in the cache 211, if any, to determine if the cache 211 also contains one or more message headers (i.e., the second-highest level of hierarchal information for the electronic mail account) corresponding to these identifiers. For example, the user may typically view the first N number of electronic mail messages (e.g., ten) in the user's regular electronic mail account. The caching system 201 would then identify the first N number of unique identifiers in the cache 211, and determine if the cache 211 also stored a message header for each of these identifiers. If the cache 211 contains these message headers, then these headers are displayed in step 415.

On the other hand, if the cache 211 does not contain message headers corresponding sin to each of the first N number of identifiers, then the trigger unit 207 will issue a trigger instructing the retrieval and caching unit 209 to update the cache 211 with message headers corresponding to the electronic mail messages identified by at least those first N number of identifiers in the cache 211 for which the cache 211 does not already have corresponding message headers. Then, in step 417, the retrieval and caching system 201 retrieves the electronic mail message associated with each of the first N number of unique identifiers in the cache 211, parses the message header from each retrieved message, and stores the message header in the cache 211. After the caching system 201 has retrieved and stored a message header for each of the first N number of identifiers in the cache 211, the system 201 displays these headers in step 415.

Next, in step 419, the user may input a request to read a particular message in the user's regular electronic mail account. If the user inputs such a request, the retrieval and caching system 201 first checks in step 421 to determine if the body or text of the message selected by the user for viewing has already been stored in the cache 211. If the body of the message has already been stored in the cache 211, then the caching system 201 displays the message body in step 423. If, however, the cache 211 does not contain a message body corresponding to the selected electronic mail message, then the trigger unit 207 issues a trigger instructing the retrieval and caching unit 209 to retrieve the message body for the selected message from the user's regular electronic mail account. Using the identifier for the selected message store in the cache 211, in step 425 the retrieval and caching unit 209 then retrieves and stores the message body in the cache 211. The retrieved message body is then displayed to the user in step 423.

If the user does not select a message to read in step 419, the user may alternately submit a request to view more messages from the user's regular electronic mail account in step 427. In response to this request, the retrieval and caching system 201 returns to step 413 to display (and retrieve, if necessary) the headers corresponding to the next N number of identifiers in the cache 211. For example, if the user typically views ten messages at a time such that N is ten, and the user has already viewed the message headers corresponding to the first ten identifiers in the cache 211 (i.e., the headers for messages 1–10), providing a request to view more message in step 427 will cause the retrieval and caching system 201 to display (and retrieve, if necessary) the headers corresponding to the next ten identifiers stored in the cache 211 (i.e., the headers for messages 11–20) in steps 413–417.

If, however, the user does not input a request to review more messages in step 427, the user may instead submit a request to check the user's regular electronic mail account in step 429. If the user makes this request, the trigger 207 will issue a trigger to the retrieval and caching unit 209 instructing the unit 209 to update the message identifiers in the cache 211. Thus, in step 431, the retrieval and caching unit 209 compares the message identifiers stored in the cache 211 with the messages currently in the user's regular electronic mail account. If the electronic mail account has received new messages that do not have corresponding identifiers in the cache 211, the retrieval and caching system 201 updates the cache 211 to include identifiers for these new messages. Similarly, if messages have been deleted from the user's regular electronic mail account, the corresponding identifier (and associated header and body information) may be deleted from the cache 211 during the update process.

Next, in step 433, if the retrieval and caching system 201 determines that the user's regular electronic mail account has not received any new messages (i.e., each message in the user's regular electronic mail account already had a corresponding identifier in the cache 211), then the caching system 201 returns to step 413 to display the headers for the messages (e.g., the messages identified by the current N number of message identifiers) already stored in the cache 211. If, however, in step 433, the caching system 201 determines that the user's regular electronic mail account has received new messages that did not already have a corresponding identifier in the cache 211, the cache 211 is updated in step 435 to retrieve and store the header for each of these new messages.

As will be appreciated from the foregoing description, the retrieval and caching unit 209 allows the information in a user's portable electronic mail account, maintained in cache 211, to be progressively updated with information from the user's regular electronic mail account. Moreover, the update procedure can be performed only to a degree that is desired by the user. This allows the retrieval and caching unit 209 to minimize the amount of the cache 211 required to update the two electronic mail accounts. It also allows the retrieval and caching unit 209 to minimize the number of update operations, as these operations may only be performed in response to a trigger. Further, by minimizing the required storage memory, the information can be cached in a fast semiconductor RAM memory, rather than in a slower, large-scale read/write memory such as a magnetic or optical disk drive. This significantly improves the speed at which the user can access the information stored in the cache.

By thus progressively obtaining and caching only a portion of the relevant information for the electronic mail messages in each retrieval and caching operation, the caching method and system according to the invention employs only the minimum amount of storage memory and network communication expense required to obtain the information needed by the user.

It should be noted that, while the above-described embodiments of the invention are described primarily with regard to the efficient retrieval and caching of message information from an electronic mail account, those of ordinary skill in the art will appreciate that the invention can be employed with any data set for which a representation will be maintained at a different location. Thus, the invention may be employed to cache information relating to any type of electronic file, and is not limited to electronic mail message files.

For example, the invention may be employed to progressively and hierarchically update a file directory, such as that provided by Windows Explorer, for data files maintained at a different storage location. This use of the invention may be beneficial, for example, where a user employs a client computer to access and manipulate data files maintained at a remote server computer. Thus, the invention may be employed to progressively retrieve different hierarchical levels of information associated with the data files (e.g., an identifier, metadata, file content, text content, image content, etc.) into a local memory on the user's client machine in the manner described above.

With this arrangement, a user may only selectively review, e.g., portions of a directory containing word processing files. Moreover, the retrieval and caching system 201 of the invention could be configured to send operational instructions to the remote computer 127 where the electronic files are persistently stored. Thus, instead of reviewing the entire directory listing, the user could view and traverse a file directory structure containing only a portion of the information for the file directory, and perform useful transactions on individual files, such as printing, faxing, forwarding, sharing, and deleting, without having to retrieve and store additional information, such as the contents of the electronic file itself, at the user's client computer.

The present invention has been described above by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, the specification is not intended to limit the invention to the exact construction and operation as illustrated and described. For example, the invention may include any one or more elements from the apparatus and methods described herein in any combination or subcombination. Accordingly, there are any number of alternative combinations for defining the invention, which incorporate one or more elements from the specification (including the drawings, claims, and summary of the invention) in any combinations or subcombinations. Hence, all suitable modifications and equivalents may be considered as falling within the scope of the appended claims.

What is claimed is:

1. A method of caching information relating to a set of data items, comprising:
   providing a first memory storing a set of data items; wherein information of each of the data items is categorized into hierarchical levels;
   in a first retrieval operation, retrieving from the first memory and storing into a second memory only a first hierarchical level of information corresponding to at least one of the data items, wherein the first hierarchical level of information comprises at least one identifier for uniquely identifying each of the at least one of the data items; and
   in a second retrieval operation separate from the first retrieval operation, retrieving from the first memory and storing into the second memory only a second hierarchical level of information corresponding to the at least one of the data items, wherein the second hierarchical level of information comprises metadata for the at least one of the data items.

2. The method of caching information recited in claim 1, wherein the data items are electronic data files.

3. The method of caching information recited in claim 2, wherein the electronic data files are electronic mail message data files.

4. The method of caching information recited in claim 1, wherein the at least one identifier for uniquely identifying each of the at least one of the data items is selected to comprise Unique Identification Listing (UIDL) identifier.

5. The method of caching information recited in claim 1, wherein the metadata includes one or more data selected from the group consisting of: a title of the at least one of the data items, a subject of the at least one of the data items, an author of the at least one of the data items, and a size of the at least one of the data items.

6. The method of caching information recited in claim 1, wherein the first memory corresponds to a user's regular electronic mail account, and the second memory corresponds to a user's portable electronic mail account.

7. The method of caching information recited in claim 1, wherein the data items are electronic mail messages, and further comprising:
   in a third retrieval operation separate from the first and second retrieval operations, retrieving and storing into the memory only a third hierarchical level of information corresponding to the at least one of the electronic mail messages.

8. The method of caching information recited in claim 7, wherein the third level of hierarchical information is an attachment to the at least one of the electronic mail messages.

9. The method of caching information recited in claim 7, wherein the third level of hierarchical information is text content of the body of the at least one of the electronic mail messages.

10. A method of caching information relating to a set of data items, comprising:
    in a first retrieval operation, retrieving and storing into a memory only a first hierarchical level of information corresponding to at least one of the data items; and
    in a second retrieval operation separate from the first retrieval operation, retrieving and storing into the memory only a second hierarchical level of information corresponding to the at least one of the data items, wherein the first retrieval operation is initiated in response to receiving a first trigger, and the second retrieval operation is initiated in response to receiving a second trigger different from the first trigger; and wherein at least one of the first trigger and the second trigger is a predictive indicator predicting a user's preferences for retrieving information from the set of data items.

11. The method of caching information recited in claim 10, wherein the set of data items are stored in a memory associated with a user's regular electronic mail account, and the first and second retrieval operations comprise storing the first and second hierarchical levels of information in a memory associated with a user's portable electronic mail account.

12. The method of caching information recited in claim 10, wherein the user's preference for retrieving information is based on retrieving electronic mail messages authored by a particular person.

13. The method of caching information recited in claim 10, wherein the user's preference for retrieving information is based on a number of unopened electronic mail messages.

14. The method of caching information recited in claim 10, wherein the data items are file directory information.

15. The method of caching information recited in claim 10, wherein the data items are electronic mail message data files.

* * * * *

US007228383C1

(12) INTER PARTES REEXAMINATION CERTIFICATE (0185th)
United States Patent
Friedman et al.

(10) Number: US 7,228,383 C1
(45) Certificate Issued: Aug. 31, 2010

(54) SYSTEM AND METHOD FOR PROGRESSIVE AND HIERARCHICAL CACHING

(75) Inventors: Gregory Scott Friedman, Sammamish, WA (US); Coyle Brett Marl, Seattle, WA (US)

(73) Assignee: Visto Corporation, Redwood City, CA (US)

Reexamination Request:
No. 95/000,332, Jan. 8, 2008

Reexamination Certificate for:
Patent No.: 7,228,383
Issued: Jun. 5, 2007
Appl. No.: 09/872,753
Filed: Jun. 1, 2001

(51) Int. Cl.
*G06F 13/00* (2006.01)

(52) U.S. Cl. .................. 711/118; 709/217; 709/220; 709/248

(58) Field of Classification Search ............... None
See application file for complete search history.

(56) References Cited

U.S. PATENT DOCUMENTS

| | | | |
|---|---|---|---|
| 5,951,636 A | 9/1999 | Zerber |
| 6,505,214 B1 | 1/2003 | Sherman et al. |
| 6,647,409 B1 | 11/2003 | Sherman et al. |
| 6,684,088 B1 | 1/2004 | Halahmi |
| 6,898,422 B2 | 5/2005 | Bern et al. |
| 2008/0037593 A1 | 2/2008 | Friedman et al. |

FOREIGN PATENT DOCUMENTS

| | | |
|---|---|---|
| JP | 11-065962 | 3/1999 |
| JP | 11-127191 A | 5/1999 |
| JP | 11-306111 A | 11/1999 |
| JP | 2000-010879 | 1/2000 |
| JP | 2000-286884 A | 10/2000 |

OTHER PUBLICATIONS

Miwa Yoshihisa, "Dissecting electronic mails, Total elucidation of backstage events when mails are received," Nikkie Network, vol. 12, Japan, Nikkei BP Co., Nikkie Business Publications, Inc., Mar. 22, 2001, pp. 70–77 (with partial translation).
M. Crispin, Request for Comments 2060, Internet Message Access Protocol—Version 4rev1, Dec. 1996.
J. Myers and M. Rose, Request for Comments No. 1939; May 1996.
R. Austein, "Synchronization Operation for Disconnected IMAP 4 Clients," Internet Draft: Disconnected Access; Nov. 1994.
M. Lambert, "PCMAIL: A Distributed Mail System for Personal Computers," Request for Comments 1056; Jun. 1988.
G. Boone, "Concept Features in RE: Agent, an Intelligent Email Agent," Georgia Institute of Technology; 1998.

*Primary Examiner*—Majid A. Banankhah

(57) ABSTRACT

A system and method that allows a user to update the contents of a portable electronic mail account to correspond with the contents of a user's regular electronic mail account, where only discrete portions of the regular electronic mail account are progressively cached in the portable electronic mail account according to a hierarchy with each update operation. By updating only a portion of the regular electronic mail account with each update operation, the service provider can minimize the amount of memory storage and communication expense necessary to maintain the portable electronic mail account, while still permitting the user to access the information important to the user.

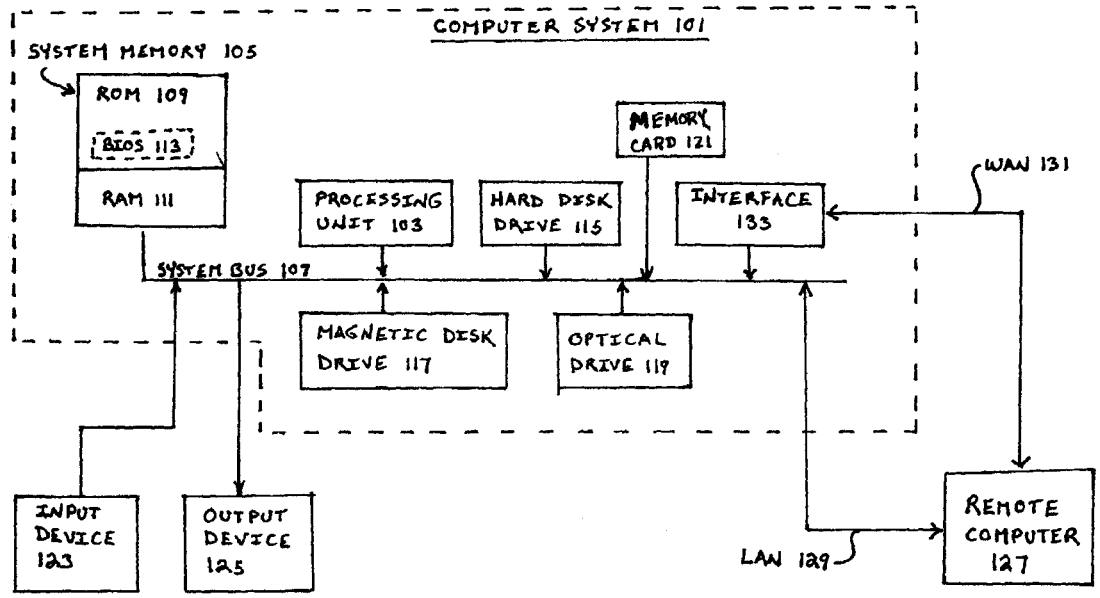

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-15 are cancelled.

* * * * *